Jan. 24, 1956　　　　　B. W. MERRILL　　　　　2,732,116
METHOD AND APPARATUS FOR APPLYING
CLOSURES TO OPEN CONTAINERS
Filed April 22, 1954　　　　　　　　　　　　6 Sheets-Sheet 1

INVENTOR.
BENNETT W. MERRILL.
BY
Joseph B. Lindecker.
Attorney.

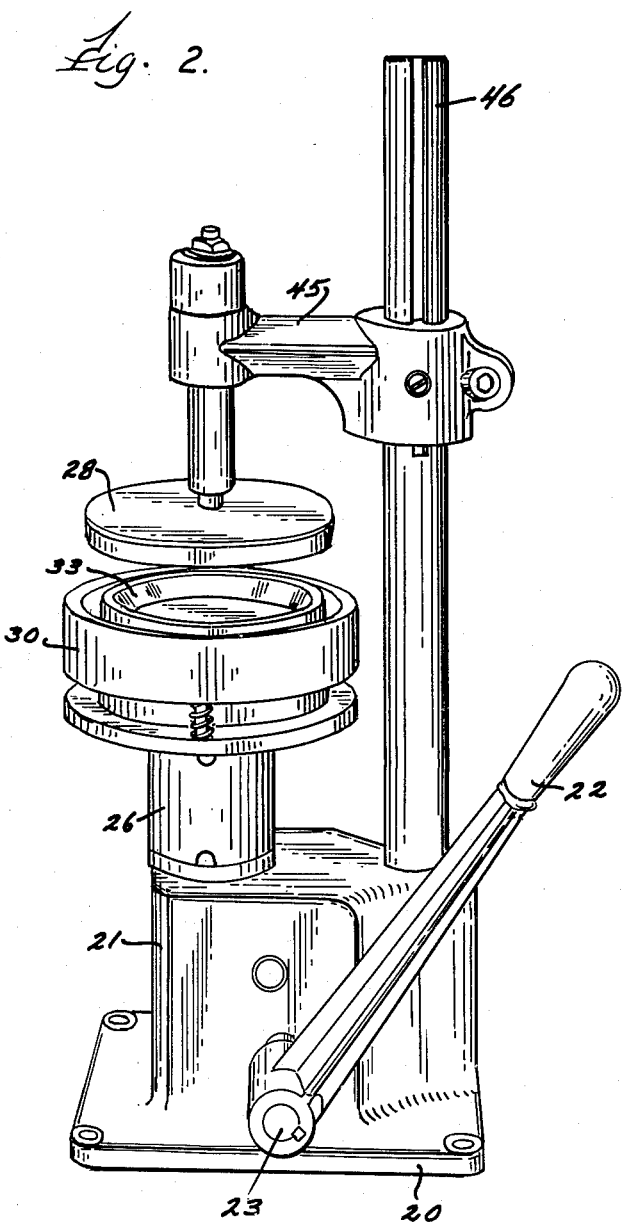

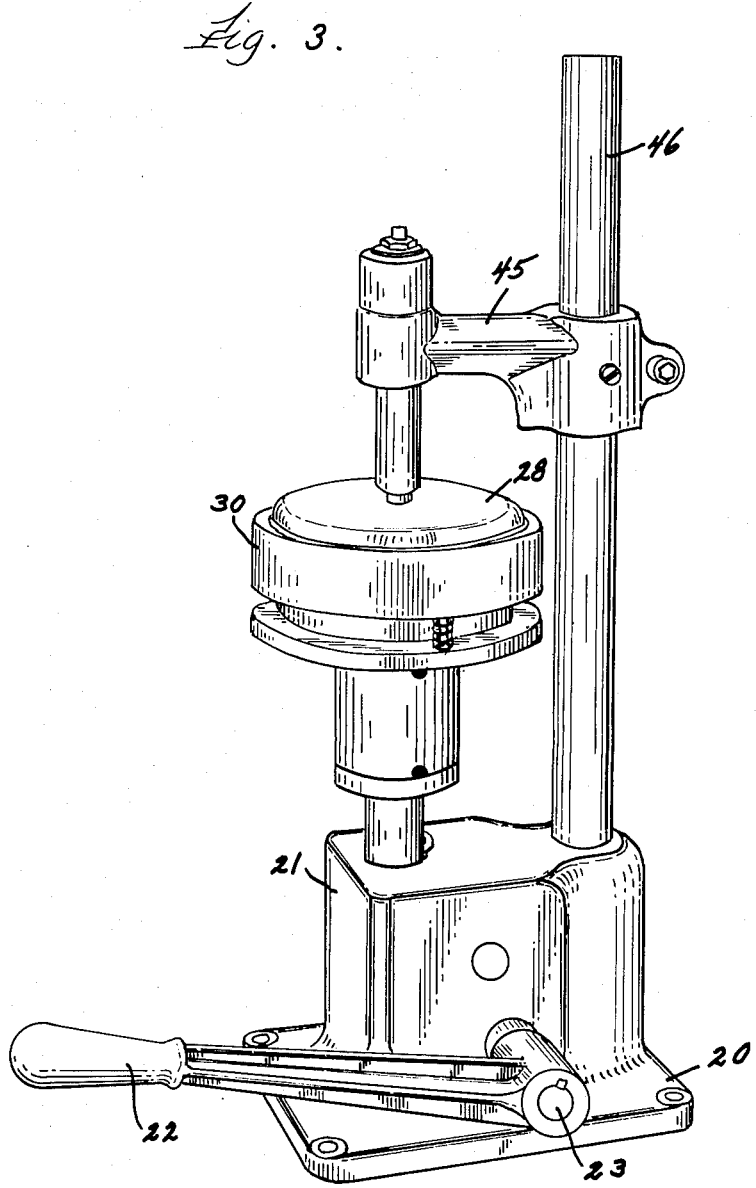

Jan. 24, 1956 — B. W. MERRILL — 2,732,116
METHOD AND APPARATUS FOR APPLYING CLOSURES TO OPEN CONTAINERS
Filed April 22, 1954 — 6 Sheets-Sheet 4
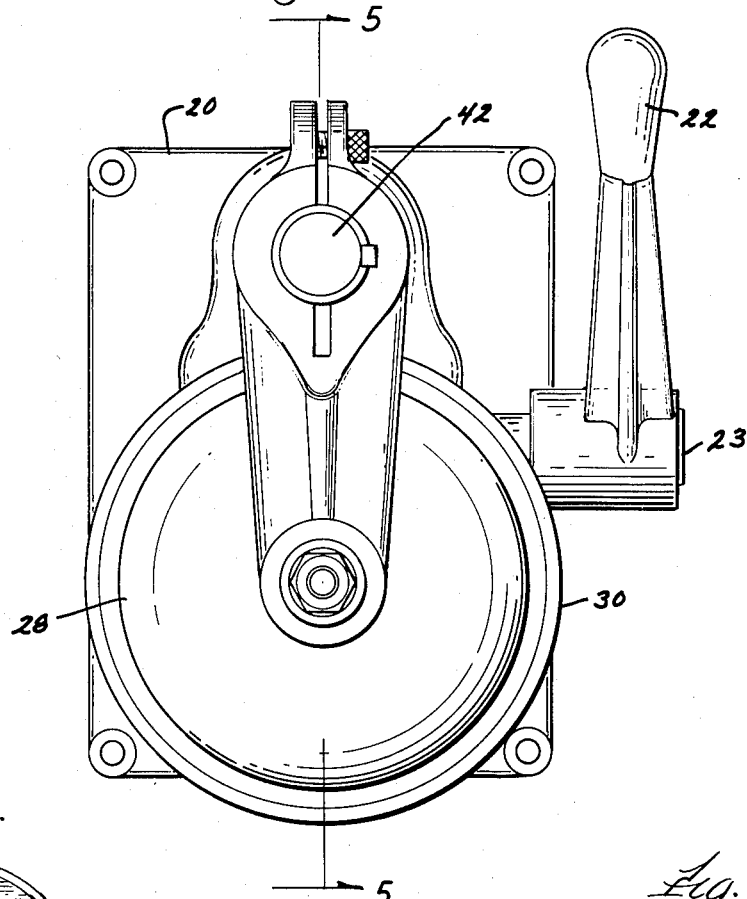
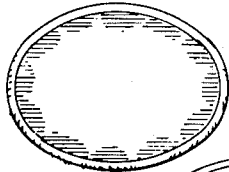
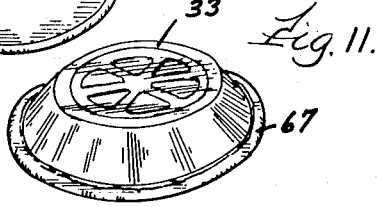
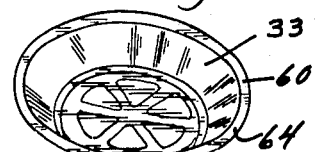
INVENTOR.
BENNETT W. MERRILL.
BY Joseph B. Lindecker,
Attorney

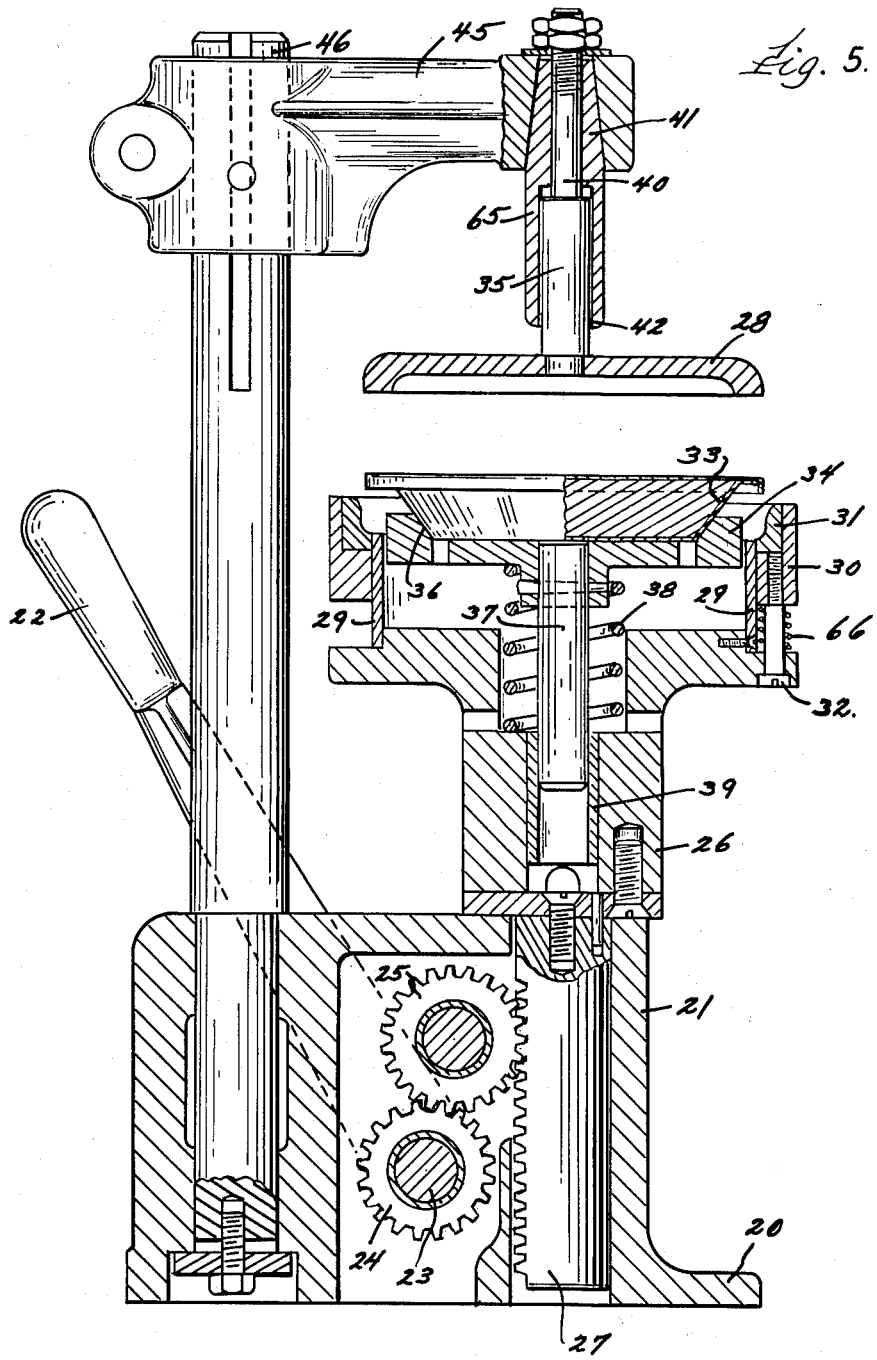

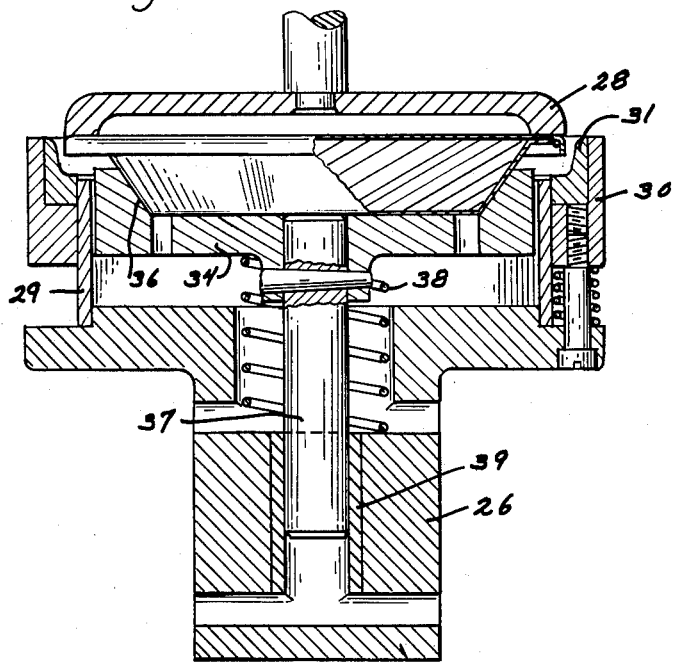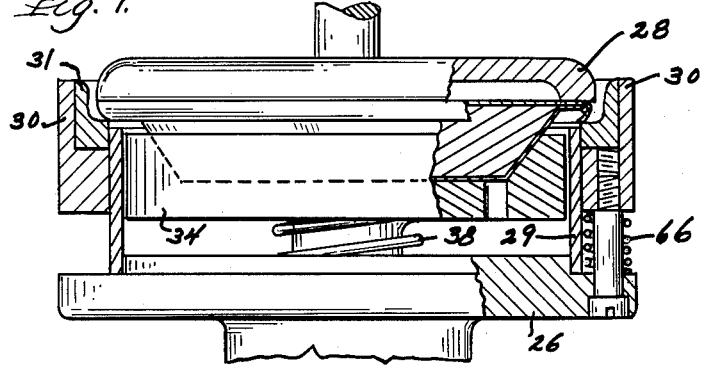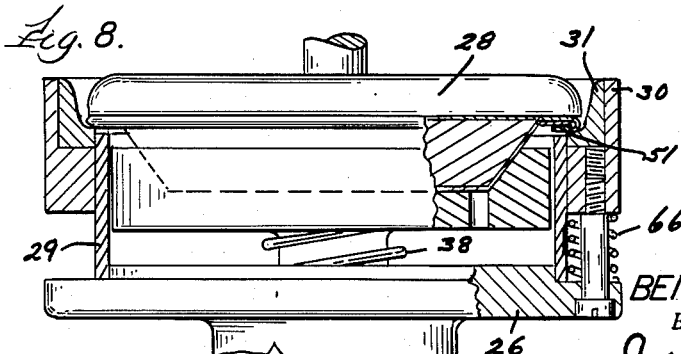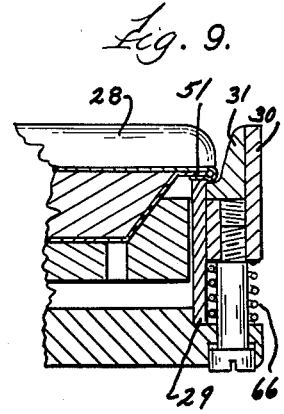
INVENTOR.
BENNETT W. MERRILL
BY
Joseph B. Lindecker
Attorney.

United States Patent Office 2,732,116
Patented Jan. 24, 1956

2,732,116

METHOD AND APPARATUS FOR APPLYING CLOSURES TO OPEN CONTAINERS

Bennett W. Merrill, Chicago, Ill., assignor to Standard Packaging Corporation, Chicago, Ill., a corporation of Virginia Application April 22, 1954, Serial No. 424,886

19 Claims. (Cl. 226—84)

The present invention relates to capping machines, and more particularly to machines for placing closures on open containers.

Heretofore, machines of this type have been used for placing closures on containers, the containers being of a rigid nature that support the closures during the seating operation.

It is one of the objects of the present invention to secure a closure upon a container whose wall strength will not support the container during the seating and sealing operation.

It is another object of this invention to provide a machine for securing closures upon containers, said machine supporting said containers in a conical recess at the same time.

A still further object of this invention is to roll the skirt portion of a closure upon the lateral preformed lip of a container.

A still further object of this invention is to roll the skirt portion of a fragile closure about the lateral preformed lip of a semi-rigid container.

Another object of this invention is to stamp the returned skirt portion of a closure into sealing relationship with the peripheral laterally projecting preformed marginal enlargement of a container.

Another object of this invention is to provide a capping machine to place, form and seal a closure about the peripheral edge portion of a container in order to accomplish the above objects.

A still further object of this invention is to secure a metal foil closure to a metal foil container with a laterally extending lip by forming the peripheral edge portion of the closure around the lip of the container and stamping it into sealing relation therewith.

A further object of the invention is to provide new and efficient methods of forming tight and efficient seals between the open end of a container having semi-rigid walls and a preformed metallic foil closure applied thereto.

The above and other objects and advantages of this invention will be more clearly understood on consideration of the following description, the appended claims, and the accompanying drawings, in which:

Figure 2 is a side view of the capping machine;

Figure 3 is a side view of the capping machine in closed position;

Figure 4 is a top view of the capping machine;

Figure 5 is a sectional view taken on line 5—5 of Figure 4;

Figure 6 is a sectional view showing the movable base table approaching the presser-plate while the presser-plate is in contact with a closure upon a container;

Figure 7 is a partially sectional view showing the movable base table with a forming die contacting the depending skirt portion of a closure upon a container;

Figure 8 shows the movable base table and the forming die, said forming die rolling the edge portion of a closure upon a container;

Figure 9 shows the movable base table and the anvil ring, said ring pressing the edge portion of the closure in contact with a flange upon a container;

Figure 10 is a top view of the article produced;

Figure 11 is a bottom view of the article produced;

Figure 12 is a top view of the closure for the container;

Figure 13 is a top view of the container.

Figure 1:
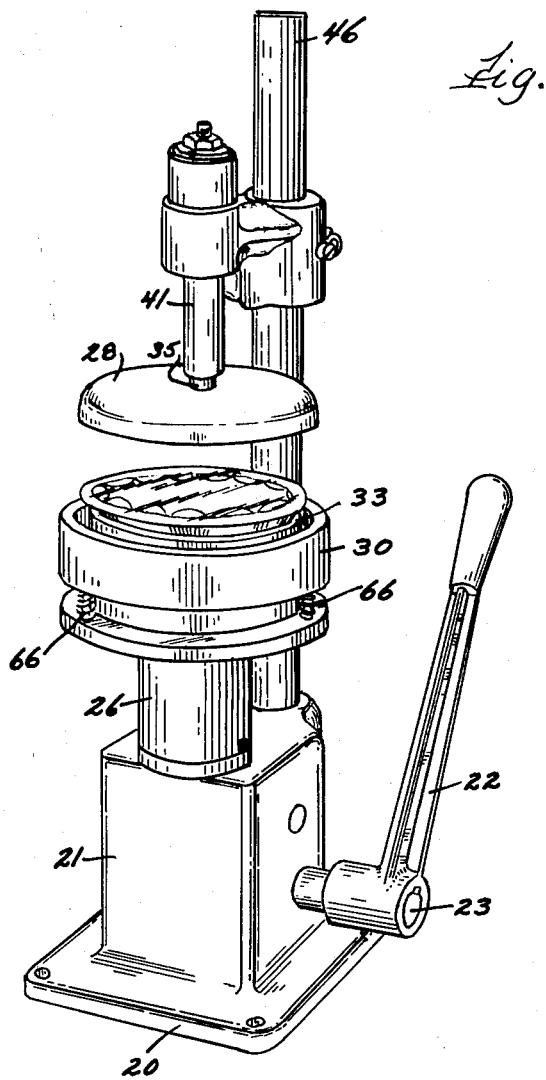
Figure 1 is a front view of the capping machine.

In Figure 1 of the drawings is shown a hand operated capper, comprising a base 20, on which is mounted the housing 21, with a lever arm 22 mounted in the side of the housing. Thus, by operating a shaft 23, shown in Figure 5, the rotation thereof operates a gear 24 and pinion 25, and raises a movable base table 26 through the intermediation of a rack 27 and said pinion 25. The movable base table 26 secured to and operated by means of the rack 27, when raised, causes a container 33, with closure thereon, to contact a substantially stationary presser-plate, or back-up plate 28. The table 26 has rigidly mounted thereon a cylindrical anvil ring 29, as shown in Figure 5. Surrounding the outside of said anvil ring are a die holder 30 and a forming die 31, both of which are resiliently mounted on a plurality of movable studs 32 and held in raised position by a plurality of springs 66. The spring-loaded forming die holder 30 and forming die 31 surround and are in sliding contact with the upper portion of said anvil 29. The forming die 31 contacts and rolls the skirt of the closure under the laterally projecting preformed marginal enlargement of the container when it is moved upwardly. The container 33, being of semi-rigid material, is supported in the center of the anvil ring by means of the container holder 34 having a conical recess 36 therein for holding the lower portion of the frusto conical container 33 in tight engagement therewith. This holder 34 is mounted on a shaft 37 and is held upwardly under spring tension by means of a spring 38, the shaft working in a bushing 39 so as to move freely therein under the spring-loaded tension. Said presser-plate 28 is mounted on a shaft 35, the upper end 40 of which is of reduced diameter and is movably mounted in a bushing 41. The lower end of bushing 41 is provided with a cylindrical bore 42. Said shaft 35 moves freely in said cylindrical bore 42, and sufficient clearance is allowed between said shaft 35 and said bushing 41 to permit some side movement thereof and permit self-aligning features. The upper end of cylindrical bore 42 provides a cavity 65, as shown in Figure 5, providing minute clearance for vertical movement of shaft 35 in bore 42, affording aid to self-aligning features. Said presser-plate 28, bushing 41 and shaft 35 are suitably mounted in an arm 45, which is adjustable with relation to a rigid upright support 46.

In operation, a container 33, as shown in Figure 13, with the laterally projecting flange 64 and preformed marginal enlargement 60, together with the contents to be packaged, is placed on the movable base table 26 within the container holder conical recess 36. Closure 62 in Figure 12, with its downwardly projecting skirt 63 on the periphery thereof, is placed over the container 33 so that it covers the flange 64 and projects downwardly therefrom. The base table 26 is then raised by moving the arm 22 into a forward position which operates the gear 24 and pinion 25, moving the rack 27 in an upward motion forcing the base table upwardly, causing the container, with closure thereon, to come in contact with the presser-plate, as shown in Figure 6. When said presser-plate 28 contacts the outer portion of the closure mounted on said container, it forces the container support downwardly, compressing the spring 38, and forcing the skirt 63 against the forming die 31, thereby rolling said skirt 63 in an inward manner, as shown in Figure 7, the skirt subsequently being forced towards the body of the container by said forming die 31, as shown in Figure 8. Said forming die 31 is held in an upwardly position by means of said plurality of springs 66, however, it is forced downwardly under the contact of the inwardly formed skirt 63 with the die 31, as shown in Figure 9, thereby allowing said formed skirt 63 to come in contact with the rigidly mounted anvil 29, thereby producing a forged contact of the skirt with the lower side of the container so as to produce a seal 67, as shown in Figure 11, not necessarily gas tight, but of such a nature as to retain the contents of the container.

The arm 22 is then moved into a forward position, lowering the table so that the container with the closure attached, as shown in Figures 10 and 11, is in the position shown in Figure 1, and may be removed.

The materials used to form the container shown in Figure 13 may be of any type of semi-rigid material, such as aluminum foil, or a foil coated paper, or a wax paper that has been so treated as to hold its shape, all of which materials have proven satisfactory in usage.

The capping machine, shown and described above, has a forming die to roll the skirt of the closure under the extended lip portion of the container, after which said skirt portion of the closure is rigidly contacted by the anvil and forced upwardly against said extended lip portion of the container. This produces a permanent deformity in the skirt so as to securely hold the same around the lower edge of the laterally projecting preformed marginal enlargement of the container, thereby producing a seal. The closure may be made of any material capable of being deformed under pressure and holding its shape after deformity; such materials as aluminum foil, or aluminum foil coated paper, or wax paper, have all proven satisfactory.

While in the above description the hand operated capping machine is described, a person skilled in the art may apply these principles to an automatic machine.

The novel improvement of the machine hereinabove described, allows the formation of a seal between a container and a closure made of such materials that the container cannot act as a support during the capping operation. This is accomplished by a positive crimping process between a closure and a container, wherein the container is of a semi-rigid nature. The weight of the container is supported on a spring-loaded holder. The forming die, after forcing the skirt of the closure inwardly, is then pushed downwardly due to the fact that said die is supported under spring tension. The anvil is forced against the closure and the container, which are both held in rigid position by the presser-plate, crimping the skirt of the closure against the edge of the container.

One of the advantages of this device is that it allows the use of containers composed of materials such as metal foil, or paper, that do not have the mechanical strength to withstand the forcing of a closure thereon. It also has the advantage that a positive crimping action forces the edge of the closure around the lip portion of the container and then positively seals the skirt against the lip portion of the container without deforming the comparatively weak walled container. These advantages are inherent in this device and may be applied to containers of any size or shape.

Although the foregoing description is necessarily of a detailed character, in order to define the structure, function and advantages of the invention, it is to be understood that the specific terminology is not intended to be restrictive or confining and that various rearrangements of parts and alternate combinations of elements may be resorted to without departing from the scope or spirit of the invention as herein claimed.

I claim:

1. In a device for securing a metal foil closure to the perimeter of the top end of an open, metal foil container, said container having a bottom portion, a frusto-conical side wall portion rising from said bottom portion, a flange extending outwardly from the top of said frusto-conical wall portion forming the perimeter of said container, in combination; a device housing, a movable base table, a substantially stationary presser-plate supported by said housing over said table, a forming die resiliently carried by said table, an anvil ring inside said die and adjacent thereto, said anvil ring rigidly secured to said table, said table adapted to receive a container with a closure loosely applied thereon when said table is in its lower and normal position, means to move said table upwardly causing said presser-plate to contact said closure positioned upon said container when said table is raised upwardly, said presser-plate forcing the edge of said closure to contact said forming die to impose an inward turning action to said edge portion of the closure, also causing a downward movement of said forming die in yielding relation thereto, and subsequently forcing said edge portion of said closure against said anvil ring to secure said closure to said container.

2. A device for securing a semi-rigid, metal closure to the perimeter of the top end of an open, semi-rigid, metal container, said container having a bottom portion, a frusto-conical side wall portion rising from said bottom portion, a flange extending outwardly from the top of said frusto-conical wall portion forming the perimeter of said container, in combination; a device housing, a movable base table, a substantially stationary presser-plate supported by said housing over said table, a forming die resiliently carried by said table, an anvil ring inside said die and adjacent thereto, said anvil ring rigidly secured to said table, said table adapted to receive a container with a closure loosely applied thereon when said table is in its lower and normal position, means to move said table upwardly causing said presser-plate to contact said closure positioned upon said container when said table is raised upwardly, said presser-plate forcing the edge of said closure to contact said forming die to impose an inward turning action to said edge portion of the closure, also causing a downward movement of said forming die in yielding relation thereto, and subsequently forcing said edge portion of said closure against said anvil ring to secure said semi-rigid, metal closure to said semi-rigid, metal container.

3. A device for crimping the peripheral edge portion of a metal foil closure beneath the peripheral lateral projecting preformed marginal enlargement at the open end of a semi-rigid, metal foil container embodying a substantially semi-rigid body longitudinally tapering from a small lower end to a large top end, comprising; a base, a movable base table, a movable container holder having a conical recess therein, a forming die resiliently carried by said table, an anvil ring rigidly mounted upon said table, a presser-plate positioned above said holder and supported by said base, said holder adapted to receive a container with a closure arranged thereon when said holder is in its lowermost position, means to raise said holder upwardly causing the peripheral edge portion of said closure to contact said presser-plate and said forming die to impose an inward turning action to the edge portion of said closure, also causing a downward movement of said forming die in yielding relation thereto, and subsequently forcing said edge portion of said closure against said anvil ring for crimping said closure to said container.

4. A device for affixing a semi-rigid closure having a depending skirt portion to the top end of an open container having an outwardly extending horizontal flange, said device comprising a housing, a movable base table, a container holder in movable relation to a forming die, said die resiliently mounted upon said table, an anvil ring within the forming die and adjacent thereto, said anvil rigidly mounted upon said table, a substantially stationary presser-plate supported by said housing above said anvil ring and said table, said presser-plate adapted to contact a closure when a container, having a closure thereon is placed upon said container holder and is moved upwardly, said presser-plate forcing the peripheral edge portion of said closure against said forming die mounted in yielding relation upon said table, and subsequently forcing said edge portion of said closure against said anvil ring to affix said closure to said container.

5. A device for affixing a metal foil closure to the top end of an open, semi-rigid container having a peripheral laterally projecting preformed marginal beaded lip, said device comprising a housing, a movable base table, a container holder in movable relation to a forming die, an anvil ring rigidly secured to said table and arranged within the forming die and adjacent thereto, a presser-plate supported by said housing over said table, said presser-plate in movable relation to said forming die and said anvil ring, said presser-plate adapted to contact a closure when a container, having a closure thereon, is positioned upon said container holder, said container being contacted by said presser-plate due to the relative movement of said holder and said table, said presser-plate forcing the edge portion of said closure against said forming die arranged in yielding relation to said holder, and subsequently forcing said edge portion of the closure against said anvil ring to affix said closure to said container.

6. A device for securing a metal foil closure, having a depending skirt portion, to the perimeter of the top of an open container having an outwardly extending flange portion, a bottom portion, a frusto-conical side wall portion rising from said bottom portion, said flange extending outwardly from the top of said frusto-conical wall portion forming the perimeter of said container, said device comprising a housing, a movable base table, a container holder having a conical recess therein to support a conical shaped container, a forming die, an anvil rigidly secured to said table and arranged within said forming die and adjacent thereto, a presser-plate supported by said housing over said table, said presser-plate adapted to contact a closure when a container, having a closure thereon, is placed in said recess in said holder and said holder is moved upwardly, said presser-plate forcing the edge portion of said closure against said forming die in yielding relation thereto, and subsequently forcing said edge portion of said closure against said anvil ring to stamp and secure said closure to said container.

7. A device for securing a metal foil closure to the perimeter of the top of an open, semi-rigid container having approximately round exterior contours, a bottom portion, frusto-conical side wall portions rising from said bottom portion, a flange extending outwardly from the top of said frusto-conical wall portions forming the perimeter of said container, said device comprising a housing, a movable base table, a movable container holder having a conical recess therein to support a conical shaped container, a forming die, an anvil ring rigidly secured to said table and arranged within said forming die and adjacent thereto, a presser-plate supported by said housing over said table, said presser-plate adapted to contact a closure when a container, having a closure thereon, is placed in said recess in said holder and said holder is moved upwardly, said presser-plate forcing the edge portion of said closure against said forming die in yielding relation thereto, and subsequently forcing said edge portion of said closure against said anvil ring to stamp and secure said closure to said container.

8. A device for affixing a semi-rigid, metal closure to the top of an open, semi-rigid container having a peripheral laterally projecting preformed marginal enlargement, said device comprising a housing, a movable base table, a container holder in movable relation to a forming die resiliently mounted upon said table, an anvil ring rigidly secured to said table and arranged within the forming die and adjacent thereto, a presser-plate supported by said housing over said table, said holder and said presser-plate adapted to receive a container with a closure arranged thereon when said holder is in its normal position, means to cause relative movement between said presser-plate and said holder causing said presser-plate to come into engagement with the closure upon said container, forcing the peripheral marginal enlargement of said closure against the forming die and said anvil ring, to affix said semi-rigid, metal closure to said semi-rigid container.

9. A device of the class described for crimping a metal foil closure on the top of an open, semi-rigid, metal foil container, comprising a housing, a movable base table, a resiliently mounted container-supporting holder, a forming die resiliently mounted upon said table, an anvil ring rigidly secured to said table, a presser-plate supported by said housing above said table, said forming die being held in yielding relation to said anvil ring, and means to cause relative movement between said table and said presser-plate.

10. A container capper having a housing, a movable base table, a container supporting holder, a presser-plate supported by said housing over said table, means for raising said table towards said presser-plate, said table having a conical recess-type container holder positioned adjacent and within an anvil ring rigidly secured to said table, and a forming die surrounding said anvil ring and resiliently mounted upon said table.

11. A closure-applying machine for affixing a semi-rigid closure having a depending skirt portion to the top end of an open container having an outwardly extending horizontal flange portion, said machine having in combination; a housing, a movable base table, a movable container-supporting holder, a forming die resiliently secured to said table, an anvil ring rigidly secured to said table and arranged adjacent and within said forming die, a presser-plate, a substantially rigid means associated with said housing for supporting said presser-plate above said table, movable means for raising said table upwardly toward said presser-plate, said die and anvil ring causing said depending skirt portion of said closure to be stamped into engagement with the flange portion of said container when said table is moved upwardly with a container and closure positioned thereon.

12. In a container-capping device, comprising a movable table, said table resiliently supporting a container holder, said holder having a conical recess therein, a housing, gears within said housing arranged upon a shaft, a handle arranged on said shaft exteriorly of said housing, a gear rack supported within said housing and arranged to travel vertically into and out of said housing, said gears in contact with said rack, said table rigidly supported upon the upper end of said rack, a presser-plate supported by said housing and positioned above said table, a forming die resiliently mounted upon said table, an anvil ring rigidly supported upon said table and adjacent and within said die, the movement of said handle on said shaft causing said gears to raise said rack, said table and said holder toward said presser-plate, said presser-plate forcing the skirt portion of a closure into contact with said die and between said anvil ring and a container flange on a container arranged upon said holder, affixing said closure to said container when said container, having said container flange, with said closure, having said skirt portion applied thereto, is positioned upon said table.

13. The method of securing a fragile closure to the top, outwardly extending, flange portion of an open, semi-rigid container, which comprises applying pressure to the top edge portion of a fragile closure to compress the same into close conformity with the upper surface of the flange portion of an open, semi-rigid container, substantially simultaneously rolling the depending skirt portion of said closure inwardly into close conformity adjacent the lower surface of said flange of said container by resiliently pressing said skirt portion between forming die members and substantially simultaneously applying pressure by an anvil ring directly upon the peripheral edge portion of said closure to compress the same upwardly and into close conformity with the lower portion of said flange of said container.

14. The method of securing a metal foil closure to the top, outwardly extending, flange portion of an open, semi-rigid container, which comprises applying pressure to the top edge portion of a metal foil closure to compress the same into close conformity with the upper surface of the flange portion of an open, semi-rigid container, substantially simultaneously rolling the depending skirt portion of said closure inwardly into close conformity adjacent the lower surface of said flange of said container by resiliently pressing said skirt portion between forming die members and substantially simultaneously applying pressure by an anvil ring directly upon the peripheral edge portion of said closure to compress the same upwardly and into close conformity with the lower portion of said flange of said container.

15. The method of securing a metal foil closure to the top, outwardly extending, flange portion of an open, metal foil container, which comprises applying pressure to the top edge portion of a metal foil closure to compress the same into close conformity with the upper surface of the flange portion of an open, metal foil container, substantially simultaneously rolling the depending skirt portion of said closure inwardly into close conformity adjacent the lower surface of said flange of said container by resiliently pressing said skirt portion between forming die members and substantially simultaneously applying pressure by an anvil ring directly upon the peripheral edge portion of said closure to compress the same upwardly and into close conformity with the lower portion of said flange of said container.

16. The method of securing a fragile closure to the top end of an open, semi-rigid container having a peripheral laterally projecting preformed marginal enlargement, which comprises applying pressure to the top edge portion of a fragile closure to compress the same into close conformity with the peripheral laterally projecting preformed marginal enlargement of an open, semi-rigid container, substantially simultaneously rolling the depending skirt portion of said closure inwardly into close conformity adjacent the lower surface of said peripheral laterally projecting preformed marginal enlargement of said container by resiliently pressing said skirt portion between forming die members and substantially simultaneously applying pressure by an anvil ring directly upon the peripheral edge portion of said closure to compress the same upwardly and into close conformity with the lower portion of said peripheral laterally projecting preformed marginal enlargement of said container.

17. The method of securing a metal foil closure to the top end of an open, semi-rigid container having a peripheral laterally projecting preformed marginal enlargement, which comprises applying pressure to the top edge portion of a metal foil closure to compress the same into close conformity with the peripheral laterally projecting preformed marginal enlargement of an open, semi-rigid container, substantially simultaneously rolling the depending skirt portion of said metal foil closure inwardly into close conformity adjacent the lower surface of said peripheral laterally projecting preformed marginal enlargement of said container by resiliently pressing said skirt portion between forming die members and substantially simultaneously applying pressure by an anvil ring directly upon the peripheral edge portion of said closure to compress the same upwardly and into close conformity with the lower portion of said peripheral laterally projecting preformed marginal enlargement of said container.

18. The method of securing a metal foil closure to the top end of an open, metal foil container having a peripheral laterally projecting preformed marginal enlargement, which comprises applying pressure to the top edge portion of a metal foil closure to compress the same into close conformity with the peripheral laterally projecting preformed marginal enlargement of an open, metal foil container, substantially simultaneously rolling the depending skirt portion of said closure inwardly into close conformity adjacent the lower surface of said peripheral laterally projecting preformed marginal enlargement of said container by resiliently pressing said skirt portion between forming die members and substantially simultaneously applying pressure by an anvil ring directly upon the peripheral edge portion of said closure to compress the same upwardly and into close conformity with the lower portion of said peripheral laterally projecting preformed marginal enlargement of said container.

19. A device for folding a depending marginal skirt of a lid member downwardly and inwardly into interlocking engagement with an outturned flange extending around the mouth of a container, comprising a structure including a bottom and side walls upstanding therefrom, a spring-pressed container support within said structure, a plate over said structure and shiftable downwardly relative to said structure, and a ring having a flared skirt deflecting inner surface encircling the upper marginal portion of said structure, said ring being upwardly spring-pressed and shiftable relative to said structure.

References Cited in the file of this patent

UNITED STATES PATENTS

| | | |
|---|---|---|
| 1,067,797 | Chellis | July 22, 1913 |
| 1,397,394 | Asbury | Nov. 15, 1921 |
| 2,357,837 | Magill | Sept. 12, 1944 |
| 2,668,650 | Wilson | Feb. 9, 1954 |
| 2,686,624 | Podesta | Aug. 17, 1954 |